Patented Mar. 31, 1942

2,278,123

UNITED STATES PATENT OFFICE 2,278,123

ANTISPASMODICS

Myron Heyn, Detroit, Mich.

No Drawing. Application January 17, 1939,
Serial No. 251,435

9 Claims. (Cl. 167—65)

This invention relates to new pharmaceutical compositions having antispasmodic properties and to a method of relieving spasmodic activity in non-striated muscles in animal organisms.

Many compounds heretofore employed as antispasmodics have undesirable characteristics which greatly curtail the scope of their application. Certain common and commercially available compounds accepted for such use are of such toxicity as to make their general application both hazardous and undesirable. The use of these materials has, in certain instances, caused undesirable stimulation of the heart, drying up of watery gland secretions, and severe skin rashes. Other compounds employed as antispasmodics are strong mydriatics and habit-forming narcotics. The development of less toxic substitutes, relatively innocuous to living organism aside from their relaxing characteristics, is desirable.

I have discovered that strong antispasmodic properties are shown by certain secondary and tertiary amines wherein the radicals attached to the nitrogen are hydrocarbon groups and at least one is a cycloalkylalkyl radical, and their salts. It has further been discovered, according to the present invention, that these compounds and antispasmodic compositions comprising such compounds as effective ingredients, are not appreciably subject to the disadvantages set forth in the preceding paragraph, being (1) considerably less toxic than such commonly employed materials as papaverine hydrochloride and atropine sulphate, (2) not inclined to cause skin rashes, heart stimulation, or drying up of watery gland secretions, and (3) having substantially no mydriatic or habit-forming tendencies. These compounds are also useful as local anesthetics.

These compounds have been found useful in the treatment of spastic conditions of the gastrointestinal, bronchial, and urogenital tracts. Among the commoner ailments which may be relieved by treatment with my new compositions are nervous indigestion, colic, asthma, hiccough, dysmenorrhea, whooping cough, spastic constipation, high blood pressure, angina pectoris, sea sickness, car sickness, air sickness, and others characterized by contraction of the non-striated muscles whether the pathology be of neurogenic or myogenic origin. The new products may be administered orally, rectally, or parenterally and are equally efficacious whether employed in powdered form, admixed with an inert solid diluent, or dissolved in a suitable liquid vehicle.

The compounds constituting the effective relaxing agents in the compositions with which the invention is concerned, are readily prepared according to known methods of synthesis. For example, the secondary amines may be prepared by reacting suitable primary amines with a cycloalkylalkyl halide, preferably in the presence of a liquid organic solvent for the reactants which is non-reactive therewith under the reaction conditions. The temperatures required for carrying out the reaction are dependent upon the particular reactants employed and may range between 10° C. and the decomposition temperature of the reaction mixture. The reactions may conveniently be carried out under the vapor phase of the reactants at the prevailing temperatures although somewhat elevated pressures may be employed if desired. Regardless of the proportions of primary amine and cycloalkyl-halide present in the reaction mixture, both secondary and tertiary amine compounds are generally formed. When an excess of the primary amine compound is employed, maximum yields of the desired secondary amine are obtained. An inorganic alkaline material such as sodium hydroxide, sodium carbonate, and the like, may be employed to facilitate the reaction. Following completion of the reaction the resultant mixed product is treated according to the usual methods for amine purification to separate the secondary amine in substantially pure form. For example, the secondary amine may be separated directly from the reaction mixture by fractional distillation under reduced pressure. Other purification methods consist of selectively extracting the mixed product with organic solvents or forming the hydrohalides of the amine mixture and separating the desired secondary amine hydrohalide by fractional crystallization from suitable media. A further method by which the secondary amines may be prepared consists of reacting a primary cycloalkylalkyl amine with a suitable hydrocarbon monohalide. The secondary amines prepared according to the above methods are in general substantialy water-white, relatively viscous liquids having a faint characteristic amine compound odor. These compounds react with acids generally to form white crystalline salts of varying solubility in water and common organic solvents.

The tertiary amine derivatives may be similarly synthesized by reacting a suitable hydrocarbon substituted amine, e. g. methyl-(cyclohexyl) amine, ethyl-(beta-phenyl-ethyl) amine, butyl-cinnamyl amine, etc., with a cycloalkyl-alkyl halide. Similarly, a cycloalkylalkyl amine, either primary or secondary, may be reacted with one or more suitable organic halides or mixture of the same as is desired. The general procedure followed in carrying out the reaction and in isolating the desired tertiary amine compound is essentially that described above for the preparation of the secondary amines. An alternative method for the preparation of certain of the tertiary amines falling within the scope of the invention consists in the reaction of a secondary amine at least one of the substituting groups of which is a cycloalkylalkyl radical with an excess of an aqueous aldehyde solution in the presence of a suitable acid, e. g. hydrochloric acid. This reaction is conveniently carried out at the reflux temperature of the reaction mixture and results in a product consisting essentially of a tertiary amine salt. The free base is readily isolated from the crude salt by neutralizing with an excess of alkali, extracting with ethyl ether and fractionating the extract.

The preparation of primary amines employed as starting materials in the production of any of the compounds included within the scope of this invention may be accomplished by reacting a suitable halohydrocarbon compound with ammonia and subsequently recovering the desired primary amine compound as by fractional distillation.

The hydrohalides and particularly the hydrochlorides of the amine bases as obtained above, are readily prepared by passing a dry hydrogen halide, e. g. hydrogen bromide, hydrogen chloride, etc., into an anhydrous ether solution of one of the free amine bases whereby the amine hydrochloride is precipitated usually as a solid crystalline product which may be separated therefrom by filtration or decantation and subsequently purified as by recrystallization. Other salts are prepared by reacting the free amine with a suitable acid according to known procedures.

The preparation, isolation, and application of the compounds which I employ as effective antispasmodics according to my invention are illustrated by the following data with respect to methyl-di-(beta-cyclohexylethyl) amine, and its hydrochloric and lactic acid derivatives.

6.2 grams (0.2 mole) of methylamine and 24 grams of beta-cyclohexylethyl iodide were dissolved in 100 milliliters of anhydrous benzene and allowed to stand over a period of 6 days at room temperature. The reaction product was filtered, and the benzene solution acidified with 85 milliliters of 15 per cent aqueous hydrochloric acid whereby a white precipitate was obtained in the benzene layer. This precipitate was filtered off, suspended in water, and the suspension made alkaline. The amine separated as an oily layer and was extracted with diethyl ether. The ether extract was dried over sodium hydroxide, evaporated to dryness on a steam bath, and the residue fractionally distilled to obtain 7 grams of methyl-di-(beta-cyclohexylethyl) amine boiling at 188°–193° C., at a pressure of about 23 millimeters. This product was redissolved in anhydrous diethyl ether and dry hydrogen chloride bubbled therethrough, whereby the hydrochloride of the tertiary amine was precipitated through the reaction mixture. The ether suspension was filtered and the residue recrystallized from ethyl acetate to obtain methyl-di-(cyclohexylethyl) amine hydrochloride as a white crystalline product melting at 257°–258° C. An aqueous solution of the lactic acid salt of the amine was prepared by reacting together equimolecular proportions of the methyl-di-(beta-cyclohexylethyl) amine and lactic acid in water.

The free amine was also prepared from a mixture of 56.5 (0.4 mole) of methyl-beta-cyclohexylethyl amine, 76.4 grams (0.4 mole) of beta-cyclohexylethyl bromide, and 42.4 grams (0.4 mole) of anhydrous sodium carbonate which was heated in a flask in an oil bath maintained at a temperature of 145°–150° C. for about 20 hours. The flask and contents were then cooled and the reaction mixture made alkaline with aqueous sodium hydroxide. The free amine base which separated from the reaction mixture as an oily layer was taken up with diethyl ether, the extract dried over sodium sulphate, and fractionally distilled whereby there was obtained 45 grams of methyl-di-(beta-cyclohexylethyl) amine.

Methyl-di-(beta-cyclohexylethyl) amine and its hydrochloric and lactic acid addition products have been found effective agents in relaxing spasmodic conditions in sections of smooth muscle whether such contractions are of natural origin or brought about by treatment of the muscle with arecoline, barium chloride, or other spasm-inducing reagents. These amine compounds are also effective on excised muscle sections which have been completely atropinized so as to cause paralysis of the parasympathetic nerve endings prior to contraction with barium chloride, and also to test sections which have been completely nicotinized whereby both sympathetic and parasympathetic nerve endings have been paralyzed. This shows that these compounds act directly on the smooth muscle tissue and not the nerve endings. This ability to act on the smooth muscle tissue itself constitutes a distinct advantage over such common parasympathetic drugs as atropine since it enables the application of the relieving principle, whether the spasm be of myogenic or neurogenic origin. Furthermore, these compounds are less toxic than either atropine or papaverine and may be administered either by hypodermic injection or orally.

In determining the effectiveness of methyl-di-(beta-cyclohexylethyl) amine hydrochloride, tests were run acording to the Magnus method as described in 1904 Arch. ges. Physiol. 102:123 (using Sollmann and Rademaekers solution, 1925 Arch. intern. pharmacodynam., 31:39). In a treatment to relieve longitudinal contractions of the excised intestines of rabbits, the compound was found consistent in relaxing ability on normal intestine in dilutions as weak as 1 to 500,000. In analogous tests, the corresponding value for papaverine hydrochloride was found to be 1 to 200,000 and atropine sulphate 1 to 400,000. This compound is therefore approximately twice as potent in its action on untreated smooth muscle tissue of the intestine as is papaverine, and approximately equal to atropine sulphate. In further tests the compound was found to eliminate the rhythmic movements of a pregnant guinea pig uterus, non-pregnant and virgin rat uteri, and guinea pig intestine, previously put into a state of tonic spasm. An antispasmodic action was also shown in the treatment of isolated guinea pig lung. On virgin rat uteri constricted with arecoline, the amine hydrochloride was definitely superior to both atropine sulphate and papaverine hydrochloride.

On an anesthetized dog, methyl-di-(beta-cyclohexylethyl) amine hydrochloride in small intravenous doses caused an evanescent drop in blood pressure. In a dosage of 1.3 milligrams per kilogram administered intravenously, a drop of 54 millimeters in blood pressure was noted in a 15 kilogram dog. The blood pressure of the test animal returned to normal in approximately 5 minutes.

The relaxing action of the amine hydrochloride on the stomach and intestines of albino rats was determined according to the method of Hesse and Zimmermann (Klinische Wochenschraft, 1933, page 1986). This method consists essentially of feeding the test animals barium sulphate by mouth, subsequently administering a solution of the amine hydrochloride by hypo and thereafter determining the amount of barium sulphate in the stomach, small and large intestines as compared to the amounts found in an animal to which the antispasmodic composition had not been administered. The results on a large series of animals demonstrated that methyl-di-(beta-cyclohexylethyl) amine hydrochloride is at least twice as effective as papaverine hydrochloride in relaxing the normal tone of the gastro-intestinal tract and allaying peristalsis.

The toxicity of methyl-di-(beta-cyclohexylethyl) amine hydrochloride was determined by administering to albino rats through a stomach tube various amounts of a suspension of equal parts by weight of barium sulphate and the amine hydrochloride in a 30 per cent mixture of glycerine and water. The test animals (unfed for 16 hours) were of mixed sexes varying in weight from 90 to 154 grams per rat. Following dosage, each animal was maintained under normal conditions for 24 hours, at the end of which time the results of the experiment were determined. In a series of 175 animals, the median lethal dose by mouth was found to be 2.5–3 grams per kilogram of body weight. This toxicity range indicates that for 132-pound adults, from 5 to 6 ounces of the compound would have to be ingested to produce a 50 per cent death rate. The median lethal doses for atropine sulphate and papaverine hydrochloride, when determined under analogous conditions, were found to be 1–1.25 grams and 1.5–2 grams per kilogram of body weight, respectively. Methyl-di-(beta-cyclohexylethyl) amine hydrochloride is therefore less than one-half as toxic as atropine sulphate and only about three-quarters as toxic as papaverine hydrochloride. Preliminary experiments in oral and parenteral administration indicate that a dosage of approximately 20 milligrams, three to four times a day, is without toxic effect on humans. Analogous results were obtained with the lactic acid derivative of methyl-di-(beta-cyclohexylethyl) amine.

In a similar manner, the physical and pharmacological characteristics of other secondary and tertiary cycloalkylalkyl amines and their salts were determined. The following table sets forth essential data concerning a number of such compounds:

| Hydrochloride of— | Melting point | Boiling point of free base | Lowest dilution relaxing excised rabbit intestine according to Magnus method |
|---|---|---|---|
| | °C. | °C. | |
| Cyclohexyl-beta-cyclohexylethyl amine. | 196–198 | 174–177 at 35 mm. | 1–200,000 |
| Ethyl-delta-cyclohexylbutyl-amine. | 201–204 | 131–134 at 19 mm. | 1–200,000 |
| Di-beta-cyclohexylethyl amine. | 244–246 | 168–175 at 8 mm. | 1–200,000 |
| Normal-amyl-beta-cyclohexylethyl amine. | 265–266 | 109–115 at 7 mm. | 1–400,000 |
| Normal-heptyl-beta-cyclohexylethyl amine. | 242–243 | 135–140 at 7 mm. | 1–400,000 |
| Methyl-beta-(4-methyl-cyclohexylethyl) amine. | 162–163 | 81–82 at 9 mm. | 1–400,000 |
| Alpha-cyclohexylethyl-beta'-cyclohexylethyl amine. | 222–223 | 165–166 at 10 mm. | 1–800,000 |
| Methyl-di-(beta-cyclohexylethyl) amine. | 257–258 | 188–193 at 23 mm. | 1–500,000 |
| Methyl-di-(delta-cyclohexyl-n-butyl) amine. | 188–191 | 225–227 at 36.5 mm. | 1–200,000 |
| Methyl-di-(gamma-cyclohexyl-n-propyl) amine. | 213–216 | 202–204 at 20 mm. | 1–500,000 |
| Ethyl-di-(delta-cyclohexyl-n-butyl) amine. | 132–135 | 230–236 at 19 mm. | 1–500,000 |
| Ethyl-di-(beta-cyclohexylethyl) amine. | 130–133 | 194–197 at 21 mm. | 1–400,000 |
| Allyl-di-(beta-cyclohexylethyl) amine. | 137–138 | 170–172 at 5 mm. | 1–500,000 |
| Ethyl-cyclohexylmethyl-beta-cyclohexylethyl amine. | 116–117 | 146–149 at 5 mm. | 1–200,000 |
| Isopropyl-di-(beta-cyclohexylethyl) amine. | Oil | 171–174 at 7 mm. | *1–400,000 |
| Normal-butyl-di-(beta-cyclohexylethyl) amine. | Oil | 176–178 at 7 mm. | *1–200,000 |
| Ethyl-(beta-cyclohexyl-ethyl)-(beta-phenyl-ethyl) amine. | 116–118 | 163–169 at 7 mm. | 1–400,000 |
| Beta-cyclohexylethyl-di-cyclohexyl amine. | 172–173 | 180–182 at 5 mm. | 1–200,000 |
| Butyl-(beta-cyclohexylethyl)-(beta-phenylethyl) amine. | 128–129 | 180–182 at 6 mm. | 1–200,000 |
| Methyl-(beta-cyclohexylethyl)-(beta-phenylethyl) amine. | 205–206 | 150–152 at 4 mm. | 1–200,000 |
| Di-butyl-beta-cyclohexylethyl amine. | Oil | 124–127 at 5 mm. | *1–200,000 |
| Methyl-beta-cyclohexylethyl-2-(6-methylheptenyl-5) amine. | Oil | 140–145 at 5 mm. | *1–200,000 |
| Methyl-(beta-cyclopentyl-ethyl) cinnamyl amine. | 183–184 | 164–167 at 8 mm. | 1–400,000 |
| Methyl-(beta-cyclohexyl-ethyl)-cyclohexyl amine. | 201–202 | 133–137 at 6 mm. | 1–200,000 |
| Methyl-(delta-cyclohexyl-butyl)-cyclohexyl amine. | 184–185 | 151–155 at 4 mm. | 1–400,000 |
| Methyl-(beta-cyclohexyl-ethyl)-n-octyl amine. | 170–171 | 139–141 at 5 mm. | 1–200,000 |
| Methyl-(beta-cyclohexyl-ethyl)-n-hexyl amine. | 203–204 | 113–117 at 5 mm. | 1–200,000 |
| Normal-propyl-di-(beta-cyclopentylethyl) amine. | Oil | 147–150 at 7 mm. | *1–400,000 |
| Normal-butyl-di-(beta-cyclopentylethyl) amine. | Oil | 153–158 at 6 mm. | *1–200,000 |
| Normal-amyl-di-(beta-cyclopentylethyl) amine. | Oil | 163–168 at 5 mm. | *1–400,000 |
| Methyl-di-(alpha-cyclohexylethyl) amine. | 179–180 | 167–169 at 12 mm. | 1–200,000 |
| Methyl-cyclohexylmethyl-beta-cyclohexylethyl amine. | 250–251 | 144–146 at 6 mm. | 1–200,000 |
| Methyl-beta-cyclohexylethyl-delta-cyclohexyl-butyl amine. | 191–192 | 160–165 at 4 mm. | 1–200,000 |
| Methyl-beta-cyclohexyl-ethyl-beta-cyclopentyl-ethyl amine. | 251–252 | 137–139 at 6 mm. | 1–200,000 |
| Methyl-beta-cyclohexyl-ethyl-gamma-cyclohexylpropyl amine. | 228–229 | 153–156 at 6 mm. | 1–400,000 |
| Methyl-(beta-cyclohexyl-ethyl) (beta-cyclo-hexenyl-ethyl) amine. | 250–251 | 145–150 at 7 mm. | 1–200,000 |
| Methyl-cyclohexylmethyl-gamma-cyclohexylpropyl-amine. | 199–200 | 140–145 at 6 mm. | 1–400,000 |
| Methyl-cyclohexylmethyl-delta-cyclohexylbutyl amine. | 179–180 | 154–157 at 6 mm. | 1–400,000 |
| Methyl-di-(beta-3-methyl-cyclohexylethyl) amine. | 228–229 | 158–161 at 7 mm. | 1–400,000 |
| Methyl-di-(beta-4-methyl-cyclohexylethyl) amine. | 241–242 | 166–170 at 9 mm. | 1–400,000 |

*Value obtained for the free amine.

The foregoing compounds may be administered either as free bases or acid addition products in a number of ways. For example, such compound may be ground or otherwise admixed with an inert solid diluent such as starch, milk sugar, talcum, dextrin, or sucrose, the concentration of the antispasmodic principle in such diluent not being critical. Isotonic aqueous solutions of the described amines and their salts in concentrations, for example of from 1 to 2 per cent, may be administered either subcutaneously or intramuscularly by hypodermic injection. Solutions for oral administration may be made up in water and/or inert and non-toxic organic solvents such as glycerol or alcohol. Likewise, the relaxing characteristics of the compounds may be utilized in ointments wherein any desired amount of the amine or its salt is dispersed as in a liquid or solid oil or fat. A further use for the compounds is in suppositories adapted for rectal administration. A representative composition for such use comprises a cocoa butter base and from approximately ½ to 2 per cent by weight of the free amine.

The secondary and tertiary amines which, in the form of their salts or as free amines, have been found most effective in relaxing spasmodic activity in non-striated muscles, are those having the formula

wherein R represents a cycloalkylalkyl radical, X represents a member of the group consisting of the alkyl, alkenyl, cycloalkyl, cycloalkenyl, cycloalkylalkyl, cycloalkenylalkyl, alkyl-cycloalkyl, and alkyl-cycloalkylalkyl radicals; Y represents a member of the group consisting of the alkyl, alkenyl, cycloalkyl, cycloalkenyl, cycloalkylalkyl, cycloalkenyl-alkyl, alkyl-cycloalkyl, alkyl-cycloalkylalkyl radicals, and hydrogen; and the sum of the carbon atoms in the X and Y of tertiary amines is at least 6.

In the cycloalkylalkyl group represented by R in the foregoing formula, the cycloalkyl radical may be, for example, cyclobutyl, cyclopentyl, cyclohexyl, cycloheptyl, cyclooctyl, etc., or substituted alkyl radicals, for example, 2-methylcyclopentyl, 3-methyl-cyclohexyl, 4-phenyl-cyclohexyl, 4-benzyl-cyclohexyl, 4-cyclohexyl-cyclohexyl, 2-isopropyl-5-methylcyclohexyl, 2.4-ditertiarybutyl-cyclohexyl, iso-propyl-cycloheptyl, 2.4.6-trimethyl-cyclohexyl, etc. The alkyl residue of the cycloalkylalkyl group represented by R, supra, may be of either straight or branched configuration with respect to the carbon atoms therein. For example, such residue may be methylene, ethylene, ethylidene, n-propylene, n-amylene, n-octylene, 1-methylethylene, 1-ethylpropylene, 1.2-dimethylethylene, 1.1-diethylpropylene radicals, etc.

Among the hydrocarbon residues represented by X and Y in the above formula are aliphatic radicals such as methyl, ethyl, n-propyl, isopropyl, secondary butyl, tertiary butyl, n-amyl, isoamyl, secondary hexyl, 1-ethyl-n-propyl, tertiary octyl, n-decyl, octadecanyl, allyl, crotonyl, pentinyl, octenyl, octadecenyl, etc. Any of the cycloalkyl, cycloalkylalkyl, or substituted cycloalkylalkyl radicals mentioned in the foregoing paragraph are also included in those groups symbolyzed by X and Y. Suitable cycloalkenyl and cycloalkenyl-alkyl radicals include cyclohexenyl, cycloheptenyl, cyclopentenylethyl, cyclohexenyloctyl, cycloheptenylpropyl, etc.

Among the acid salts, the use of which as antispasmodics are included within the scope of my invention, are the addition salts of any of the secondary and tertiary amines herein described with hydrochloric, hydrobromic, sulphuric, nitric, phosphoric, acetic, tartaric, citric, benzoic, phenylacetic, phenoxyacetic, lactic, maleic, malic, cresotinic, phthalic, naphthoic, salicylic, and pyromucic acids, and the like.

I therefore particularly point out and distinctly claim as my invention:

1. A composition adapted to be employed for the relaxation of contractions of muscular tissue comprising (a) as an effective ingredient a compound selected from the group consisting of secondary and tertiary amines having the formula

wherein R represents a cycloalkylalkyl radical, X represents a member of the group consisting of the alkyl, alkenyl, cycloalkyl, cycloalkenyl, cycloalkylalkyl, cycloalkenyl-alkyl, alkyl-cycloalkyl, and alkyl-cycloalkylalkyl radicals; Y represents a member of the group consisting of the alkyl, alkenyl, cycloalkyl, cycloalkenyl, cycloalkyl-alkyl, cycloalkenyl-alkyl, alkyl-cycloalkyl, alkyl-cycloalkylalkyl radicals, and hydrogen; and the sum of the carbon atoms in the X and Y of tertiary amines is at least 6; and their salts; and, (b) a diluent which is nontoxic and substantially theropeutically inert in the dosages employed.

2. A composition for relieving spasmodic contraction of the non-striated muscles comprising (a) as an effective ingredient a compound having the formula

wherein R represents a cycloalkylalkyl radical, X represents a member of the group consisting of the alkyl, alkenyl, cycloalkyl, cycloalkenyl, cycloalkylalkyl, cycloalkenyl-alkyl, alkyl-cycloalkyl, and alkylcycloalkylalkyl radicals; Y represents a member of the group consisting of the alkyl, alkenyl, cycloalkyl, cycloalkenyl, cycloalkylalkyl, cycloalkenyl-alkyl, alkyl-cycloalkyl, alkyl-cycloalkylalkyl radicals, and hydrogen; and the sum of the carbon atoms in the X and Y of tertiary amines is at least 6; and, (b) a diluent which is nontoxic and substantially therapeutically inert in the dosages employed.

3. A composition for relieving spasmodic contraction of the non-striated muscles comprising (a) as an effective ingredient a salt of a compound having the formula

wherein R represents a cycloalkylalkyl radical, X represents a member of the group consisting of the alkyl, alkenyl, cycloalkyl, cycloalkenyl, cycloalkylalkyl, cycloalkenyl-alkyl, alkyl-cycloalkyl, and alkyl-cycloalkylalkyl radicals; Y represents a member of the group consisting of the alkyl, alkenyl, cycloalkyl, cycloalkenyl, cycloalkylalkyl, cycloalkenyl-alkyl, alkyl-cycloalkyl, alkyl-cycloalkylalkyl radicals, and hydrogen; and the sum of the carbon atoms in the X and Y of tertiary amines is at least 6; and, (b) a diluent which is nontoxic and substantially therapeutically inert in the dosages employed.

4. A composition for relieving spasmodic contraction of the non-striated muscles comprising (a) as an effective ingredient a salt of a secondary amine having the formula

wherein R represents a cycloalkylalkyl radical, and X represents a member of the group consisting of the alkyl, alkenyl, cycloalkyl, cycloalkenyl, cycloalkylalkyl, cycloalkenyl-alkyl, alkyl-cycloalkyl, and alkyl-cycloalkylalkyl radicals; and, (b) a diluent which is nontoxic and substantially therapeutically inert in the dosages employed.

5. A composition for relieving spasmodic contraction of non-striated muscles comprising (a) as an effective ingredient a salt of a tertiary amine having the formula

where each R represents a cycloalkylalkyl radical, and X represents a member of the group consisting of the alkyl, alkenyl, cycloalkyl, cycloalkenyl, cycloalkylalkyl, cycloalkenyl-alkyl, alkyl-cycloalkyl, and alkyl-cycloalkylalkyl radicals; and, (b) a diluent which is nontoxic and substantially therapeutically inert in the dosages employed.

6. A composition for relieving spasmodic contraction of non-striated muscles comprising (a) as an effective ingredient a tertiary amine having the formula

wherein each R represents a cycloalkylalkyl radical, and X represents a member of the group consisting of the alkyl, alkenyl, cycloalkyl, cycloalkenyl, cycloalkylalkyl, cycloalkenyl-alkyl, alkyl-cycloalkyl, and alkyl-cycloalkylalkyl radicals; and, (b) a diluent which is nontoxic and substantially therapeutically inert in the dosages employed.

7. A composition adapted to be employed for the relaxation of contractions of muscular tissue comprising (a) as an effective ingredient a salt of methyl-di-(beta-cyclohexylethyl) amine; and, (b) a diluent which is nontoxic and substantially therapeutically inert in the dosages employed.

8. A composition for relieving spasmodic contraction of the non-striated muscles comprising (a) as an effective ingredient methyl-di-(beta-cyclohexylethyl) amine hydrochloride; and, (b) a diluent which is nontoxic and substantially therapeutically inert in the dosages employed.

9. A composition for relieving spasmodic contraction of the non-striated muscles comprising (a) as an effective ingredient methyl-di-(beta-cyclohexylethyl) amine; and, (b) a diluent which is nontoxic and substantially therapeutically inert in the dosages employed.

MYRON HEYN.